Sept. 24, 1968  A. G. BODINE  3,402,612
GEARED OSCILLATOR FOR RESONANT SYSTEMS
Original Filed Oct. 8, 1964  2 Sheets-Sheet 1
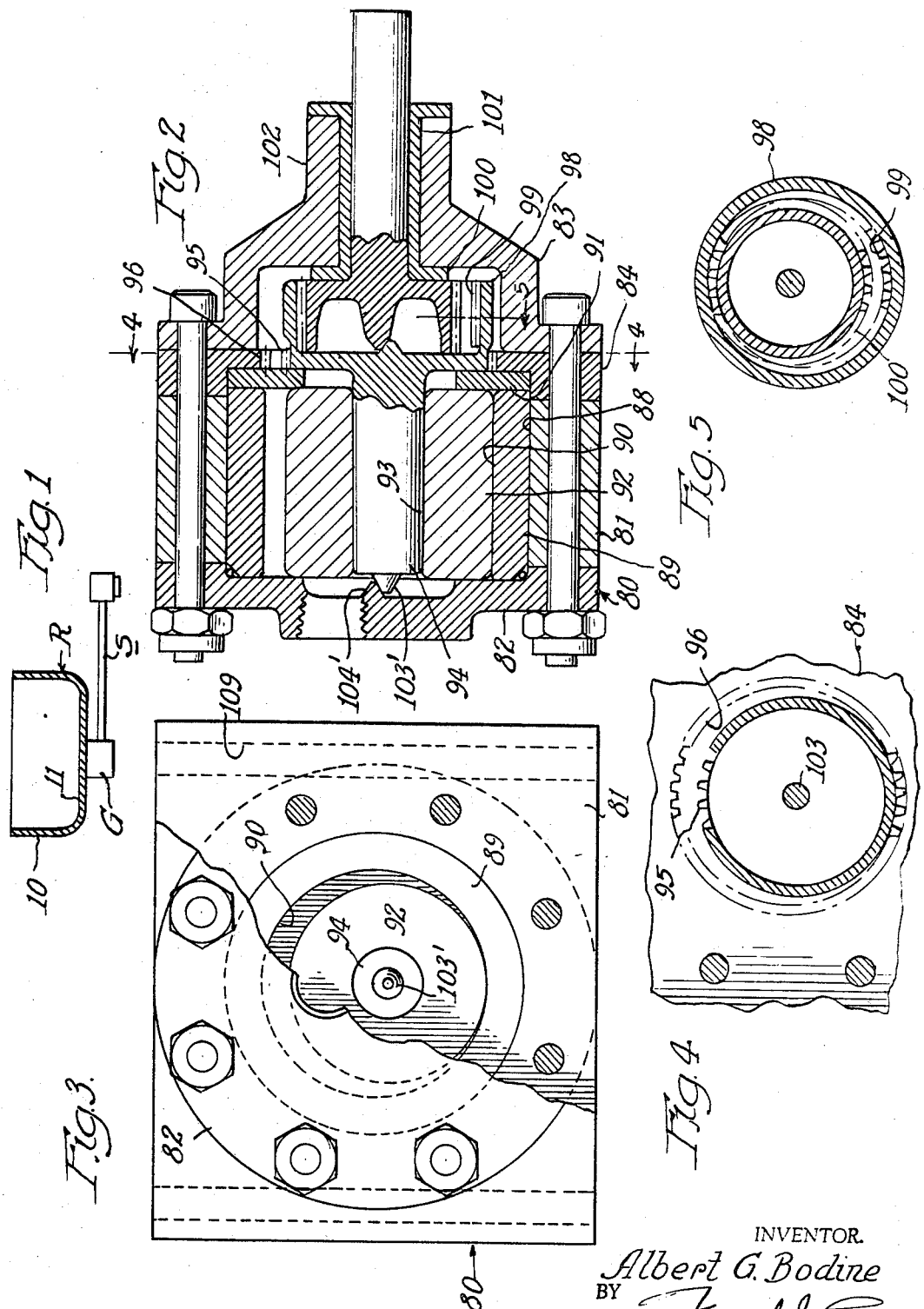
INVENTOR.
Albert G. Bodine
BY
Attorney Sept. 24, 1968  A. G. BODINE  3,402,612
GEARED OSCILLATOR FOR RESONANT SYSTEMS
Original Filed Oct. 8, 1964  2 Sheets-Sheet 2
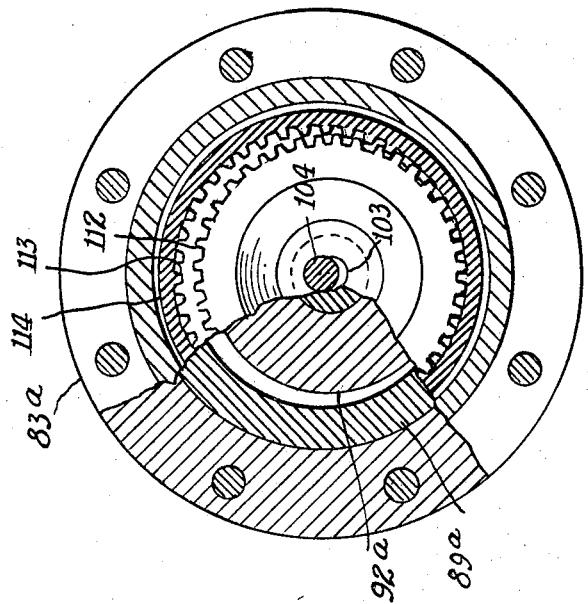
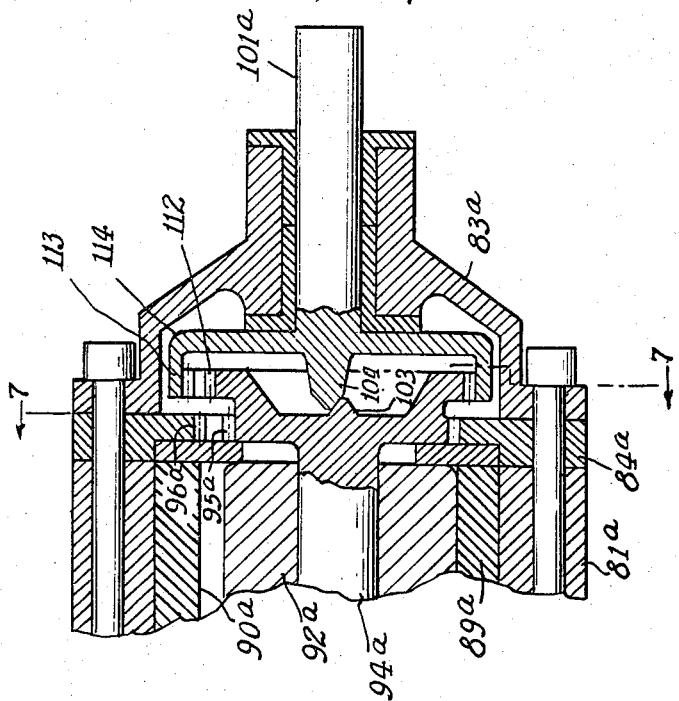
INVENTOR.
Albert G. Bodine
BY
Attorney United States Patent Office 3,402,612
Patented Sept. 24, 1968

3,402,612
GEARED OSCILLATOR FOR RESONANT SYSTEMS
Albert G. Bodine, Los Angeles, Calif.
(7877 Woodley Ave., Van Nuys, Calif. 91406)
Continuation-in-part of application Ser. No. 370,217,
May 26, 1964. Division of application Ser. No.
402,474, Oct. 8, 1964, now Patent No. 3,299,722,
dated Jan. 24, 1967. This application Dec. 6, 1966,
Ser. No. 599,612
8 Claims. (Cl. 74—87)

ABSTRACT OF THE DISCLOSURE

The output of a vibration generator is coupled to a resonant member in a region thereof having significant resonant pattern motion. The vibration generator comprises a rotor member which is driven orbitally around a raceway bearing formed in the generator body. The rotor has a planetary gear thereon which meshes with a mating internal gear on the vibration generator body. Rotational input for the rotor is provided through an input gear which meshes with a drive gear attached to the rotor.

---

This application is a continuation-in-part of my application Ser. No. 370,217, filed May 26, 1964, entitled Sonic Soil Cultivator, now Patent No. 3,231,025, and is a division of my copending application Ser. No. 402,474, filed Oct. 8, 1864, and entitled Mechanical Sonic Vibration Generator With Frequency Step-Up Characteristic, allowed Aug. 22, 1966, and now Patent No. 3,299,722, issued Jan. 24, 1967.

This invention relates generally to vibration generators or oscillators, especially for setting up vibrations in resonant load devices, and particularly in various forms of industrial vibratory machinery, often of very powerful, heavy-duty type.

The present invention may be regarded as dealing with improvements in the resonant load vibration generators shown in my prior Patent No. 3,217,551. Vibration generators of the general class to which the present invention appertains are of the class having an orbiting inertia roller or rotor which rolls around the inside of a cylindrical raceway in an orbital path. This inertia roller exerts a centrifugal-force bearing load on the raceway, which permits a linear component of vibration to be taken off along any diameter of the raceway.

According to my said prior Patent No. 3,217,551, the inertia roller was driven in its orbital path by a drive shaft coupled thereto through a pair of universal joints, so that the drive shaft could describe a conically gyratory motion path, traveling at one end with the roller, while its opposite end remained positioned on the axis of the raceway.

The conically gyratory drive shaft used in the generator described in the immediately preceding paragraph is mechanically disadvantageous in some applications and also somewhat limited as regards choice of drive ratios from the drive means for the conically gyratory shaft to the cyclic force impulse derived from the generator. A particular mechanical disadvantage of this system is that the conical motion path of the drive shaft involves angular movements of such large amplitude as to bring about universal joint problems of great severity at sonic frequency, and these have not been entirely satisfactorily solved in the past.

Accordingly, it is a broad purpose of the invention to provide a vibration generator of the general class here considered, but incorporating novel gear drive means for the orbiting inertia roller which do not require the conically gyratory shaft, and which also lend themselves more readily to choice of drive ratios from initial drive means to the cyclic force output from the generator. In most cases, the initial drive shaft for the generator is positioned on the axis of the cylindrical bearing or raceway, and drives the inertia rotor through a special drive gear set as just mentioned. This has particular novelty and advantage with resonant systems which vibrate with large amplitude, as well as large changes in amplitude.

Special coactions and advantages of the orbiting roller generator and resonant load combinations are set forth in my aforementioned parent application Ser. No. 402,474, and need not be redescribed herein, but the description thereof in Ser. No. 402,474 is incorporated herein by this reference.

Illustrative examples of the invention are shown in the accompanying drawings, and will now be described, reference now being had to these drawings, in which:

FIG. 1 is a diagrammatic view showing the vibration generator of the invention coupled to a typical resonant load;

FIG. 2 is a longitudinal medial section through an illustrative embodiment of the invention;

FIG. 3 is an end elevation, looking toward the right, in FIG. 1;

FIG. 4 is a transverse section on line 4—4 of FIG. 1;

FIG. 5 is a section on line 5—5 of FIG. 1;

FIG. 6 is a view similar to a portion of FIG. 1 but showing a modification;

FIG. 7 is a transverse section on line 7—7 of FIG. 5.

Referring first to the diagrammatic illustration of FIG. 1, a vibration generator G in accordance with the invention in indicated as driven from a motor M through some form of flexible drive shaft $s$, whose flexibility need be only sufficient to accommodate the variable vibration amplitude of resonant load device or member R coupled to the generator G. Any simple known way of affording the necessary flexibility for the shaft $s$ may be utilized. Thus the shaft may itself be flexible or include a flexible section, as taught in my aforesaid application Ser. No. 402,474, or universal joints may be used, as in my prior Patent No. 3,217,551, though the universal joints need accommodate only small angular deflections and hence may be of simple and conventional design, such as shown in FIG. 9 of my Patent No. 3,231,025, which has copending status with the present case. The resonant load device R is here indicated for illustrative purposes as a tank 10 with an elastically flexible vibratory bottom 11. The generator G is fixed to the center of this bottom 11. The tank 10, in an acoustic circuit with the generator G, affords mass and elasticity parameters such that the tank 10 becomes a resonant member, or resonator, when the vibration generator is driven by motor M at a predetermined resonant frequency of the system. The generator systems of the invention are to be understood as involving in each case a resonant member driven by the generator.

Referring now to the generator G in FIGS. 2-5, this generator has a housing 80 made up, in this instance, of an intermediate body member 81, and two end caps 82 and 83, together with a spacer member 84 between block 81 and cap 83. The members 81-84 are bolted in assembly, as shown. A bore 88 extends through body 81 and is continued a short distance into end cap 82 and spacer 84, as best seen in FIG. 2. Mounted in this bore 88 is a hardened steel raceway cylinder 89, in which is a cylindrical raceway bore 90. As shown, a washer 91 is used in spacer 84 at the end of the raceway cylinder 89. Mounted in the raceway bore 90 is a hardened steel cylindrical inertia roller 92, of a diameter somewhat less than the internal diameter of raceway bore 90, typically in the proportions shown in FIG. 2. The roller 92 is adapted to roll around the inside of the bearing surface defining the bore 90, and its ends are relatively closely confined between the washer 91 at one end and the inside face of cap 82 at the other.

Inertia roller 92 has an axial bore 93 which rotatably receives a shaft or axle 94 projecting axially from a spur gear 95, which is a planet gear. The roller 92 taken together with shaft 94 and the gear 95 comprise a rotor. The gear 95, which may also be termed a phasing gear, has a pitch circle corresponding substantially to the diameter of the roller 92. This gear 95 meshes with a stationary internal gear 96, which may be termed a raceway gear, and which is formed in the aforementioned spacer 84. Internal gear 96 has a pitch circle corresponding substantially with the diameter of raceway bore 90.

Projecting axially from the spur gear 95 is a cup 98 in which is formed an internal drive gear 99, which meshes with an input spur gear 100 on the end of a drive shaft 101 journalled in the hub 102 of end cap 83 coaxially with raceway 90. Input gear 100 will be seen to be of somewhat smaller diameter than drive gear 99, and, in the position of the parts illustrated in FIG. 2, to mesh with internal drive gear 99 at the top. Attention is directed to the fact that in this position, phasing gear 95 is in mesh with raceway gear 96 at the bottom, or in other words, at a point diametrically opposite from the point of meshing of gear 99 with gear 100. In operation, inertia roller 96 rolls around raceway bearing surface 90, and is held in contact therewith by centrifugal force. While the generator is at rest, or coming up to speed, the roller, 92 is maintained in close adjacency to bearing surface 90 by means of interengaging conical axial projections 103 and 104 on the axle 94 and gear 100, respectively, and similar interengaging projections 103' and 104' on the axle 94 and end cap 82, respectively, as clearly shown in FIG. 2.

In operation, rotation of drive shaft 101 turns spur gear 100, which, being in engagement with internal drive gear 99 on one side, i.e. at a point of tangency between the two, causes rotation of internal gear 99. The phasing gear 95 integral with the thus driven gear 99, then rolls around the inside of stationary internal gear 96 with which it meshes at its point of tangency diametrically opposite from the point of tangency between the internal gear 99 and spur gear 100. Axle 94 and inertia rotor 92 mounted thereon thus gyrate, with the inertia roller 92 rolling around the inside of cylindrical bearing surface 90. As mentioned hereinabove, when the generator is up to speed, centrifugal force developed by the rotation of the roller 92 causes it to bear with considerable force against the bearing surface 90. A good nonslipping, rolling engagement is thereby attained. As will appear, the roller 92 rolls around the inside of cylindrical bearing surface 90 substantially in step with the rolling of the spur gear 95 around the internal gear 96. Any tendency for roller 92 to describe this orbital path with a different rate of rotation on its axis from the rotation of the spur gear 95 on the axis of the latter, is accommodated by slight relative rotation of roller 92 and the axle 94.

The centrifugal force developed by the relatively massive inertia roller 92 rolling in its orbital path around the inside the bearing or race ring 89, at the raceway surface 90 therein, results in exertion of substantial gyratory force on the generator housing 80. This gyratory force is transmitted from the generator housing to whatever resonant device is to be subjected to this gyratory force. To accommodate securement or coupling of the housing 80 to a device to be subjected to this gyratory output force, the housing 80 may be provided with any suitable facilities, such as drill holes 109 adapted to receive machine screws, not shown.

Reference is next directed to FIGS. 6 and 7, showing a modification of the generator of FIGS. 2–5. This generator G of FIGS. 6 and 7 is in most respects identical with that of FIGS. 2–5, and accordingly, corresponding parts are identified by corresponding reference numerals, but with the subscript a added in the case of FIGS. 6 and 7. A repeated description of these corresponding parts will not be necessary and is omitted. In FIGS. 6 and 7, the phasing gear 95a is like the gear 95 of FIGS. 2–5, but instead of carrying a cup with an internal gear, as in FIGS. 2–5, is formed at one side with a coaxial spur drive gear 112. This spur drive gear 112 meshes with an internal input gear 113 in a cup 114 on the extremity of drive shaft 101a.

The generator thus described is constructed and operates much as does that of FIGS. 2–5, the only essential and important difference being that in the case of the generator of FIGS. 6 and 7, the mutual point of contact of the drive and input gears 112 and 113, respectively, is on the same side of the longitudinal axis of the generator as the point of contact between the phasing and raceway gears 95a and 96a, respectively, and also, of course, on the same side as the point of contact between the roller 92a and the raceway surface 90a.

The consequence of the differences between the two embodiments of the invention now described resides in different ranges of gear ratios. In this regard, the embodiment of FIGS. 2–5 is a "low-ratio" design, in which the frequency of vibration of the vibratory output relative to the frequency of input shaft rotation can vary, within practical limitations of gear size and design, from about one-to-five step-down to five-to-one step-up. The embodiment of FIGS. 6 and 7, on the other hand, is a high-ratio design in which the frequency of vibration relative to the frequency of input shaft rotation can vary within a range of from about two-to-one step-up to a theoretical infinite step-up, limited only by practical gear design.

It will be noted that with these generators it is not necessary that the input drive shaft follow the orbiting path of the rotor. This problem has been automatically taken care of in a better manner by the fact that the meshing teeth of the drive gear, at each and every instant, are always in engagement. Hence the drive shaft need only accommodate for the amplitude of vibration of the resonant system. It is accordingly possible to employ a practical flexible drive means, such as universal joints or the like, because these elements do not have to accommodate large amplitude at sonic frequency which is almost impossible with known universal joints under such high "Q" conditions.

Moreover, these lighter duty universal joints can be very sensitive, and of low friction, so as to permit sonic frequency resonant operation, particularly with change of amplitude.

The subject matter of the invention is capable of embodiment in numerous practical and physical forms, with considerable range for modification and reorganization. The two embodiments here chosen for illustrative purposes, therefore, are to be taken as typical, and to imply no limitation on freedom of design within the scope of the spirit of the invention.

I claim:
1. In a vibration generator, the combination of:
    a resonant member;
    a generator body coupled to said resonant member in a resonant impedance region having resonant pattern motion;
    bearing means on said generator body providing a cylindrical raceway bearing;
    an inertia rotor adapted for orbital travel around said raceway bearing;
    said rotor comprising an inertia roller of smaller diameter than said raceway, and positioned to run on said raceway in an orbital path;
    a drive gear;
    an input gear;
    a planet gear coaxial with said roller and connected therewith so as to be movable in an orbital path with said roller, said drive gear being a spur gear and said input gear being an internal gear in mesh therewith on the same side of the axis of said race- way as the point at which said roller contacts said raceway.

2. The subject matter of claim 1, including an input drive shaft coaxial with said cylindrical raceway and coupled to said internal input gear and a cup member connected to said drive shaft and projecting axially outwardly therefrom, said input gear being formed in said cup member;

3. In a vibration generator, the combination of:
a resonant member;
a generator body coupled to said resonant member in a resonant impedance region having significant resonant pattern motion;
bearing means on said generator body providing a cylindrical raceway bearing;
an inertia rotor adapted for orbital travel around said raceway bearing;
said rotor comprising an inertial roller of smaller diameter than said raceway, and positioned to run on said raceway in an orbital path;
a planet gear coaxial with said roller and connected therewith so as to be movable in an orbital path with said roller;
a stationary internal gear on said body of greater diameter than said planet gear, and in mesh therewith;
a drive gear coaxially fixed relative to said planet gear;
a rotatable input gear coaxial with said cylindrical raceway bearing meshing with said drive gear; and
a cup member operatively connected to said roller and projecting axially outwardly therefrom;
said drive gear being an internal gear formed in said cup member and said input gear being a spur gear in mesh therewith on the side of the axis of said raceway diametrically opposite from the point at which said roller contacts said raceway.

4. In a vibration generator, the combination of:
a resonant member;
a generator body coupled to said resonant member in a resonant impedance region having significant resonant pattern motion,
bearing means on said generator body providing a cylindrical raceway bearing;
an inertia rotor adapted for orbital travel around said raceway bearing;
said rotor comprising an inertia roller of smaller diameter than said raceway, and positioned to run on said raceway in an orbital path;
a planet gear coaxial with said roller and connected therewith so as to be movable in an orbital path with said roller;
a stationary internal gear on said body, of greater diameter than said planet gear, and in mesh therewith;
a drive gear coaxially fixed relative to said planet gear; and
a rotatable input gear coaxial with said cylindrical raceway meshing with said drive gear;
said drive gear being a spur gear and said input gear being an internal gear in mesh therewith on the same side of the axis of said raceway as the point at which said roller contacts said raceway.

5. In a vibration generator, the combination of:
a resonant member;
a generator body coupled to said resonant member in a resonant impedance region having significant resonant pattern motion;
bearing means on said generator body providing a cylindrical raceway bearing;
an inertia rotor adapted for orbital travel around said raceway bearing;
said rotor comprising an inertia roller of smaller diameter than said raceway, and positioned to run on said raceway in an orbital path;
a planet gear coaxial with said roller and connected therewith so as to be movable in an orbital path with said roller;
a stationary internal gear on said body, of greater diameter than said planet gear, and in mesh therewith;
a drive gear coaxially fixed relative to said planet gear;
a rotatable input gear coaxial with said cylindrical raceway meshing with said drive gear;
a shaft extending coaxially through and having rotational bearing within said inertia roller, said planet gear being mounted on said shaft, said drive gear comprising an internal gear connected to said shaft coaxially therewith;
said input gear comprising a spur gear; and
a drive shaft for said last mentioned spur gear supported coaxially of said cylindrical raceway bearing.

6. The subject matter of claim 5, wherein said planet gear and said stationary internal gear in mesh therewith are displaced axially from said inertia roller and said raceway bearing.

7. In a vibration generator, the combination of:
a resonant member;
a generator body coupled to said resonant member in a resonant impedance region having significant resonant pattern motion;
bearing means on said generator body providing a cylindrical raceway bearing;
an inertia rotor adapted for orbital travel around said raceway bearing;
said rotor comprising an inertia roller of smaller diameter than said raceway, and positioned to run on said raceway in an orbital path;
a planet gear coaxial with said roller and connected therewith so as to be movable in an orbital path with said roller;
a stationary internal gear on said body, of greater diameter than said planet gear, and in mesh therewith;
a drive gear coaxially fixed relative to said planet gear;
a rotatable input gear coaxial with said cylindrical raceway meshing with said drive gear; and
a shaft extending coaxially through and having rotational bearing within said inertia roller, said planet gear being mounted on said shaft, said drive gear comprising a spur gear connected to said shaft coaxially therewith, said input gear and internal ring gear in mesh with said spur gear and supported for rotation coaxially of said cylindrical raceway bearing.

8. The subject matter of claim 7, wherein said planet gear and said stationary internal gear in mesh therewith are displaced axially from said inertia roller and said raceway bearing.

References Cited

UNITED STATES PATENTS 2,198,148 4/1940 Baily _____ 74—87
2,553,541 5/1951 Bodine _____ 173—49 X

FOREIGN PATENTS 219,920 7/1961 Austria.

MILTON KAUFMAN, *Primary Examiner.*